United States Patent [19]

Tew

[11] Patent Number: 5,332,049

[45] Date of Patent: Jul. 26, 1994

[54] COMPOSITE DRILL PIPE

[75] Inventor: Craig Tew, Lincoln, Nebr.

[73] Assignee: Brunswick Corporation, Lake Forest, Ill.

[21] Appl. No.: 953,013

[22] Filed: Sep. 29, 1992

[51] Int. Cl.$^5$ .............. E21B 17/04; E21B 17/10; E21B 17/20

[52] U.S. Cl. .................. 175/320; 138/109; 166/242; 175/325.2; 285/149

[58] Field of Search ............... 175/320, 325.1, 325.2; 166/242, 241.1; 138/109, 143, 155; 285/149, 238, 239, 242

[56] References Cited

U.S. PATENT DOCUMENTS

| | | |
|---|---|---|
| 2,259,023 | 10/1941 | Clark . |
| 2,295,873 | 9/1942 | Stone . |
| 2,515,365 | 7/1950 | Zublin . |
| 2,943,009 | 6/1960 | Mirsky .................. 154/110 |
| 3,156,489 | 11/1964 | Deringer .................. 285/114 |
| 3,508,768 | 4/1970 | Hogan .................. 285/149 |
| 3,948,575 | 4/1976 | Rosser .................. 175/325.2 |
| 4,146,060 | 3/1979 | Garrett .................. 175/325.2 X |
| 4,185,472 | 1/1980 | Yates et al. .................. 138/109 X |
| 4,236,386 | 12/1980 | Yates .................. 138/109 X |
| 4,258,804 | 3/1981 | Richey .................. 175/325 |
| 4,380,443 | 4/1983 | Federmann .................. 464/181 |
| 4,530,379 | 7/1985 | Policelli .................. 138/109 |
| 4,647,078 | 3/1987 | Lundy .................. 285/149 |
| 4,649,960 | 3/1987 | Policelli .................. 138/109 |
| 4,685,895 | 8/1987 | Hatten .................. 464/19 |
| 4,701,231 | 10/1987 | Peters .................. 156/172 |
| 4,810,010 | 3/1989 | Jones .................. 285/149 X |
| 4,813,715 | 4/1989 | Policelli .................. 285/149 |
| 4,950,001 | 8/1990 | Briggs .................. 285/149 |
| 4,987,961 | 1/1991 | McNeely, Jr. .................. 175/320 |
| 5,236,018 | 8/1993 | Kobayashi et al. .................. 138/109 X |

OTHER PUBLICATIONS

Buckle Resistant Composite Drill String For Extended Reach and Horizontal Drilling (AEA Petroleum Services) & (Rogalandsforskning) (61 pages).

Primary Examiner—Hoang C. Dang
Attorney, Agent, or Firm—Wood, Phillips, VanSanten, Hoffman & Ertel

[57] ABSTRACT

A composite drill pipe has a fiber reinforced synthetic tube with a leading end and a trailing end spaced axially from the leading end, with the leading end of the tube being engageable with a bit for drilling a bore through the earth when a force is applied to the trailing end of the tube. Hardened steel fittings are attached to the opposite tube ends and have interengageable threaded portions for joining a plurality of serially arranged drill pipes and forming a flexible drilling string of desired length. Radial holes are drilled around the circumference of the tube ends and into the steel fittings, and stainless steel dowel pins are press fit into the holes to provide a mechanical lock between the composite tube and the fittings. A steel sleeve is placed over the is bonded to the outer surface of the tube. A series of steel-encased centralizer buildups are spaced along the length of the composite tube to align the tube within the well bore and to prevent contact between the tube exterior and the sidewalls of the bore when the tube is advanced therethrough.

18 Claims, 5 Drawing Sheets

COMPOSITE DRILL PIPE

BACKGROUND OF THE INVENTION

1. Technical Field

This invention generally relates to drilling strings used to bore wells in the earth and, more particularly, to a non-metallic pipe for drilling a deviated well bore.

2. Background Art

As is generally known, underground petroleum reserves, water, and soluble minerals often are accessed through vertical bores which extend downwardly through the earth. To create a vertical bore, a rotating metal tube having a leading bit or cutting element is penetrated through the crust of the earth's surface and is advanced downwardly until the tube reaches an oil bearing formation. The drilling string then is withdrawn from the bore and oil or other desired substances are pumped upwardly from the formation and through the bore with known extraction techniques.

In an environment where a substance reserve cannot be accessed with a conventional straight vertical well bore, directional drilling techniques are used to create a deviated or extended-reach bore. Generally, a flexible rotary drilling string is inserted through the vertical portion of an existing straight well bore. When the leading end of the drilling string reaches a predetermined depth, the drill bit is deviated from the straight path and burrowed through the sidewall of the existing well bore. The drilling string continuously is advanced to create a relatively short-radius curved bore having a substantially horizontal passage which can extend hundreds of feet to reach an otherwise inaccessible oil bearing formation, water supply, or mineral reserve.

It may be understood from the foregoing that in order to create a suitable deviated well bore a drilling string must be sufficiently flexible to permit continuous angular displacement of the string while, at the same time, providing adequate structural integrity to withstand the compression force and bending load which are induced when the string is advanced through the earth. Moreover, while a drilling string must be ductile enough to accommodate overall angular deformation in excess of ninety degrees, the string must also be capable of enduring the abuse inherent in the downhole environment.

Attempts have been made at providing an acceptable drilling string by connecting a number of short metal tubes, such as the articulated drill pipe shown in U.S. Pat. No. 4,685,985 to Hatten, issued Aug. 11, 1987 (see FIG. 1). The Hatten drill pipe, generally designated 10, has a plurality of interlocked metal "jigsaw puzzle" pipe sections 12 which are lowered through the straight portion of a substantially vertical well bore 14. A cutting assembly 16 at the leading end of the drill pipe then is deviated from the straight path to create a curved bore 18. These types of drilling strings have a number of problems.

Specifically, the articulated connection between successive pipes is achieved with a dove-tail joint or a hinge Joint. Articulated joints permit excessive and erratic movement of the articulated pipe sections which, in turn, requires frequent directional measurements and appropriate corrections to the orientation of the bit to drill along a desired path. In addition, the joints continuously open and close as the pipe rotates. Cuttings can enter the openings and induce significant joint wear and degradation.

Metal drill pipes are very heavy and awkward to handle, making the installation and operation of the drill pipe both cumbersome and dangerous. The extreme weight of metal drill pipes produces large friction forces when the pipe is rotated about an axis off vertical, such as when the pipe is used to drill a horizontal bore. The friction forces induce excessive wear of the articulated pipe and thus limit the horizontal distance which can be drilled. Moreover, the geometry of the "jigsaw puzzle" piece lobes in a dove-tail joint may produce high stress concentrations which result in fatigue failure after an unacceptably few number of cycles.

The present invention is directed toward overcoming one or more of the problems set forth above.

SUMMARY OF THE INVENTION

An object of the invention, therefore, is to provide a composite pipe assembly for drilling a deviated well bore in the earth.

In the exemplary embodiment of the invention, a plurality of composite drill pipes or pipe sections are interconnected end-to-end to form a flexible drilling string. An endmost composite drill pipe has a fiber reinforced synthetic tube with a leading end and a trailing end spaced axially from the leading end. The leading end of the tube is engageable with a bit for drilling a bore through the earth when a force is applied to the trailing end of the tube. A centralizer is provided on the tube to align the tube within the well bore and to prevent contact between the tube exterior and the sidewalls of the bore when the tube is advanced therethrough. The composite tube can have a length in the range of about 20 feet to about 40 feet and can have a density in the range of about 0.06 pounds per cubic inch to about 0.08 pounds per cubic inch.

The centralizer consists of a buildup of glass fibers wrapped around the periphery of the composite tube to create a radially extending bulge. A steel sleeve encases the bulge and is attached thereto by means of an adhesive bond between the sleeve and the glass fibers and a series of circumferentially spaced pins which extend radially through the sleeve and the buildup. A number of centralizer buildups preferably are spaced axially along the length of the tube between the leading end and the trailing end.

In operation of the drill pipe, fluid under pressure is forced into the trailing end of the composite tube and is forced out through the leading end of the tube to lubricate the bit and wash cuttings outside the tube and toward the surface of the well through an annulus between the outside of the drill pipe and the walls of the oil well bore. A synthetic liner extends through the tube to isolate the inner wall from fluid in the tube, and a wear resistant outer coating shields the exterior of the tube from the cuttings and other abrasive materials in the bore. The liner consists of an elastomeric material, such as rubber, or, alternatively, can consist of plastic. A suitable outer coating is formed of an epoxy compound which contains ceramic beads.

In order to serially connect a number of drill pipes and form a flexible drilling string of desired length, the leading end of each composite tube has a metal fitting, such as a male fitting, and the trailing end of each tube also has a metal fitting, such as a female fitting. The male fittings and the female fittings are complementary and interengageable, whereby the adjacent ends of a plurality of successively arranged composite tubes are joined together. More specifically, a male fitting has an externally threaded portion which is received in an internally threaded portion on an adjacent female fitting.

The fittings preferably are made of hardened steel and have an external taper machined at an end opposite the threads. Each end of the composite tube has an internal taper complementary to the external taper on the fittings, and a metal fitting is seated in each of the tapered tube ends and is adhesively bonded thereto. Radial holes are drilled around the circumference of the tube ends and into the steel fittings, and stainless steel dowel pins are press fit into the holes to provide a mechanical lock between the composite tube and the hardened steel fitting. A steel sleeve is placed over the composite/steel interface and is welded to the fitting and bonded to the outer surface of the tube.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, may be best understood by reference to the following description taken in conjunction with the accompanying drawings, in which like reference numerals identify like elements in the figures and in which:

DETAILED DESCRIPTION OF THE INVENTION

Figure 1:
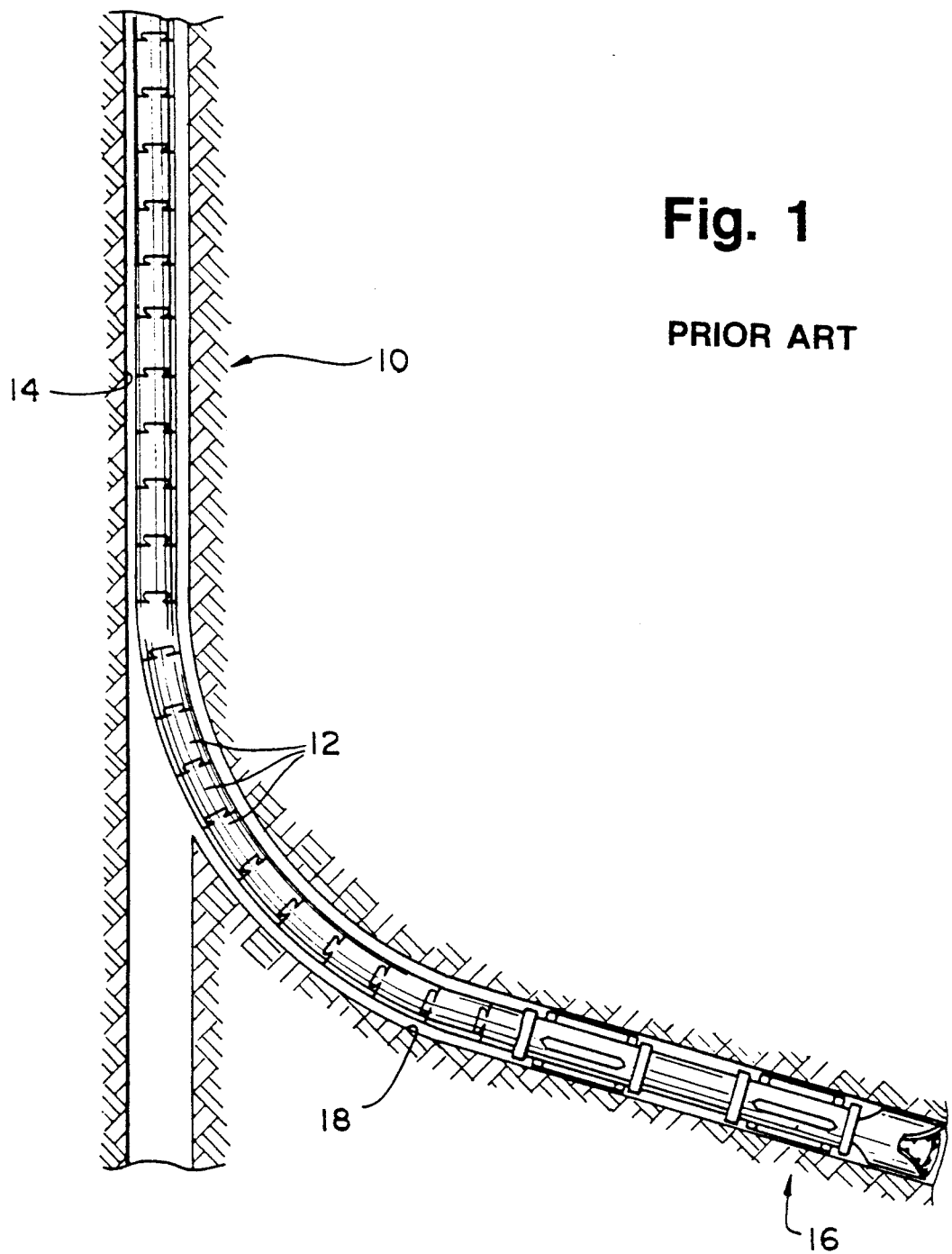
FIG. 1 is a side elevational view of a prior art drilling string.

As stated above with respect to FIG. 1, a prior art drill pipe, generally designated 10, has a plurality of interlocked metal "jigsaw puzzle" pipe sections 12 which are lowered through the straight portion of a substantially vertical well bore 14. A cutting assembly 16 at the leading end of the drill pipe then is deviated from the straight path to create a curved bore 18.

Figure 2:
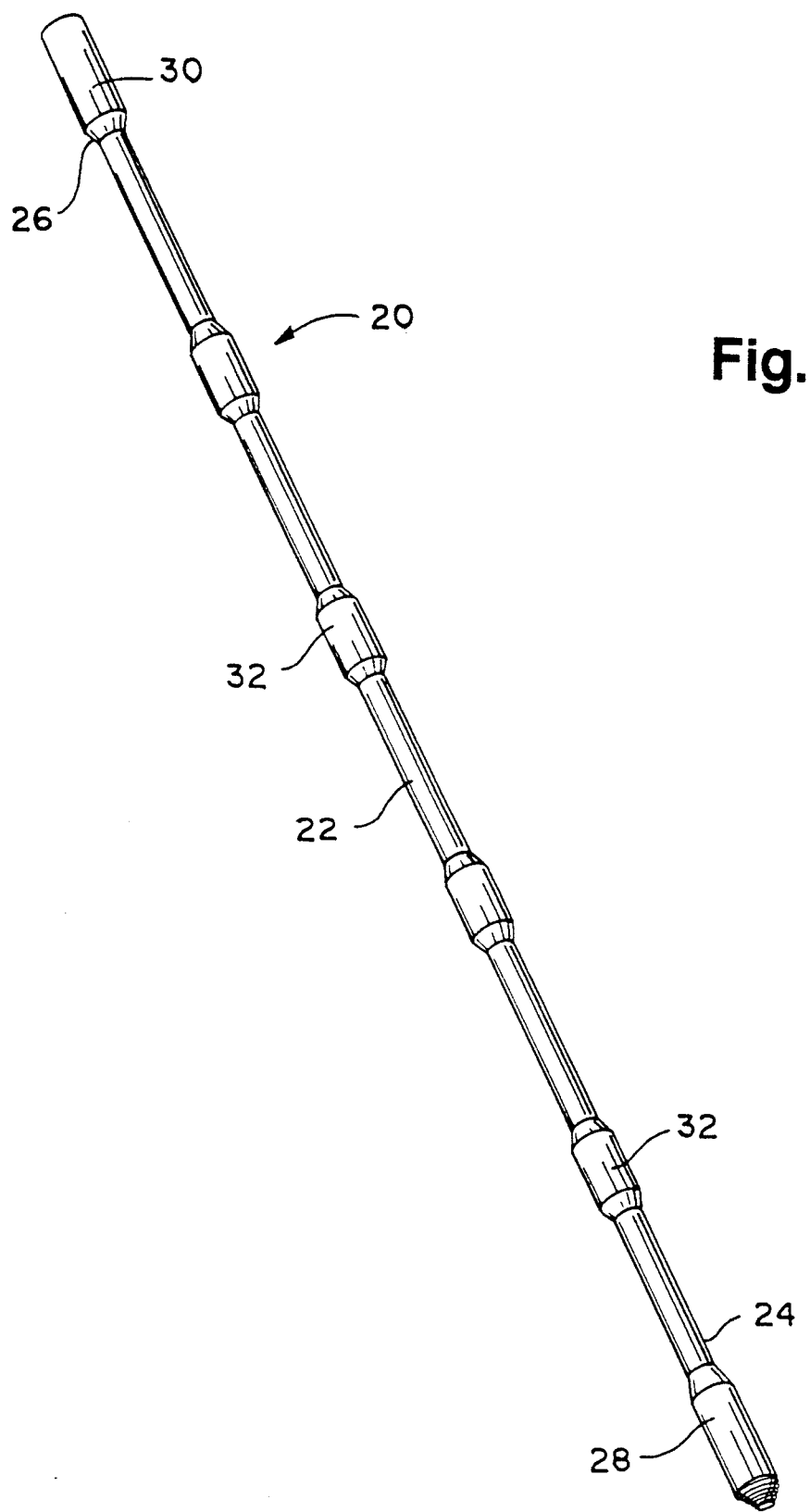
FIG. 2 is a perspective view of a composite drill pipe according to the invention used to create a drilling string.

Referring now to FIG. 2, an exemplary composite drill pipe is generally designated 20 and has a fiber reinforced flexible synthetic tube 22 which extends between a tube leading end 24 and a tube trailing end 26. As noted above, a plurality of drill pipes 20 are interconnected end-to-end to form a flexible drilling string. To that end, the tube leading end has a pin connector 28 and the tube trailing end has a complementary box connector 30 whereby a plurality of drill pipes 20 may be serially connected to define a drilling string of desired length. Moreover, tube leading end 24 is engageable with a cutting tool or bit (not shown) for drilling a bore through the earth when the tube is rotated and a downward force is applied to tube trailing end 26. Generally, a single drill pipe 20 has a length in the range of about twenty feet to about forty feet, and a number of pipes are connected to define a drilling string suitable for drilling a deviated well bore having a radius of curvature in the range of twenty feet to forty feet. Synthetic tube 22 has a density in the range of about 0.06 pounds per cubic inch to about 0.08 pounds per cubic inch. A plurality of radial centralizers 32 are spaced axially along the length of synthetic tube 22 and serve to align the tube within a well bore to prevent contact between the tube and the sidewalls of the bore when the drill pipe is advanced therethrough.

In the exemplary embodiment of the invention, drill pipe 20 is twenty-five feet long and weighs approximately ninety pounds. The disclosed drill pipe has an inside diameter of approximately 1.5 inches, and the exterior diameter of the drill pipe is approximately 2.6 inches. Radial centralizers 32 are equidistantly spaced approximately 4.5 feet and have an outside diameter of approximately 3.375 inches.

Synthetic tube 22 has a filament wound composite core 34 (see FIGS. 3–5) with a cylindrical internal passage 36 for supplying a cooling and lubricating fluid to the drill bit at the bottommost end of a drilling string. That is, as is generally known, "drilling mud" is forced into the trailing end of a drill pipe and is forced out through the leading end to lubricate the drill bit and wash cuttings outside the tube. The drilling mud and cuttings are forced upward toward the surface of the well through the annulus formed between the outside of the drill pipe and the sidewalls of the well bore.

A rubber liner 38 is bonded to the inside diameter of composite core 34 and extends between tube leading end 24 and tube trailing end 26 to protect the inside of the drill pipe from pressurized drilling mud. While rubber offers sufficient flexibility and impermeability, it should be understood that the invention also envisions the use of a liner consisting of any elastomeric or plastic material suitable for the stated purpose.

A wear resistant coating 40 may be applied over the exterior of composite core 34 to protect the drill pipe from contact with the washed cuttings. The drill cuttings that are circulated back up the well bore are abrasive to the exterior of the composite core and can cause significant damage to the structural fibers even if exposed to the tube exterior for short lengths of time. A preferable coating 40 consists of a high elongation epoxy compound filled with wear resistant ceramic beads.

Figure 3:
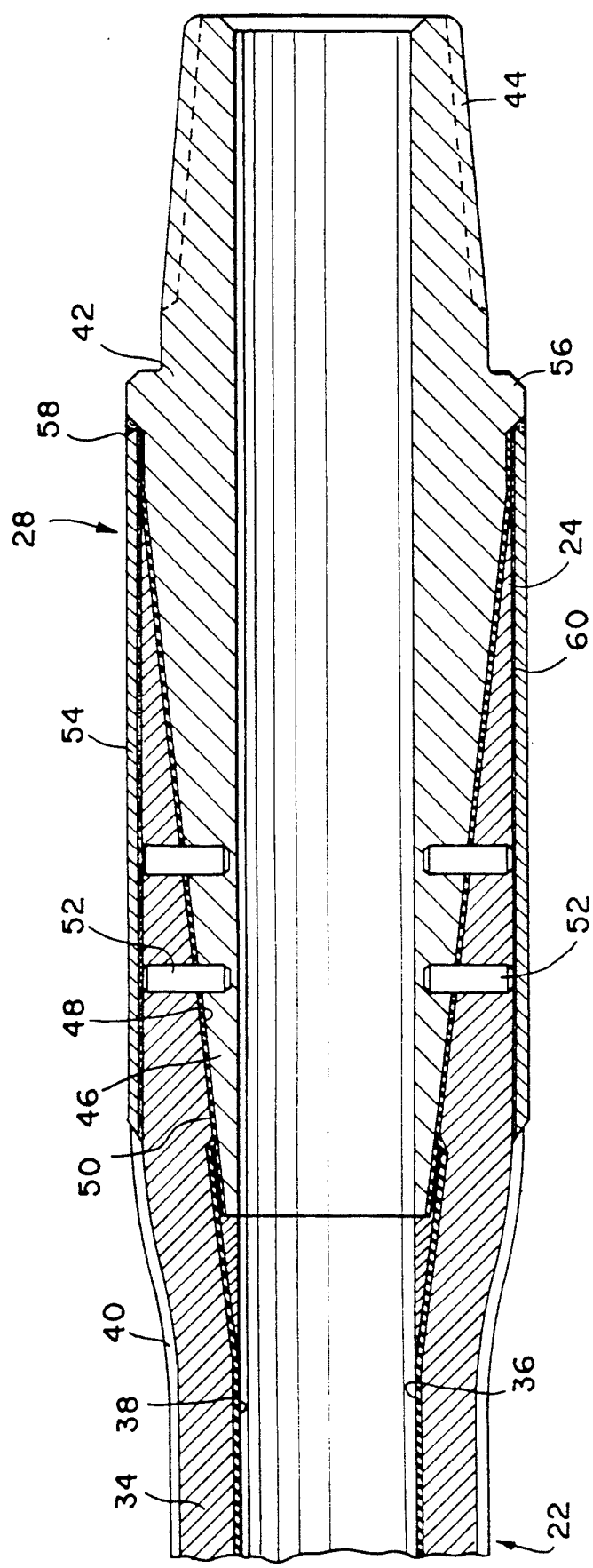
FIG. 3 is a sectional view of the male metal end fitting on the leading end of a composite drill pipe of the invention.

Pin connector 28 is shown in FIG. 3 and has a hardened steel end fitting 42 bonded in leading end 24 of synthetic tube 22. The end fitting has a threaded male nipple 44 and an opposite externally tapered end 46 seated in a complementary taper 48 in the tube leading end with an adhesive bond 50 formed therebetween. In addition to the adhesive bond, the end fitting is mechanically locked to the leading end of the tube by a plurality of circumferentially spaced stainless steel dowel pins 52 (four shown in FIG. 3). Radial holes are drilled around the circumference of the tapered leading end of tube 22 and into end fitting 42. The dowel pins then are press fit into the radial holes to interlock the composite material and the steel end fitting. A steel sleeve 54 is drawn over the resulting joint between end fitting 42 and the tube leading end and is abutted with an annular hub 56 on the end fitting. The sleeve is welded to the steel end fitting, as at 58, and is adhesively bonded to the tube end, as at 60.

Figure 4:
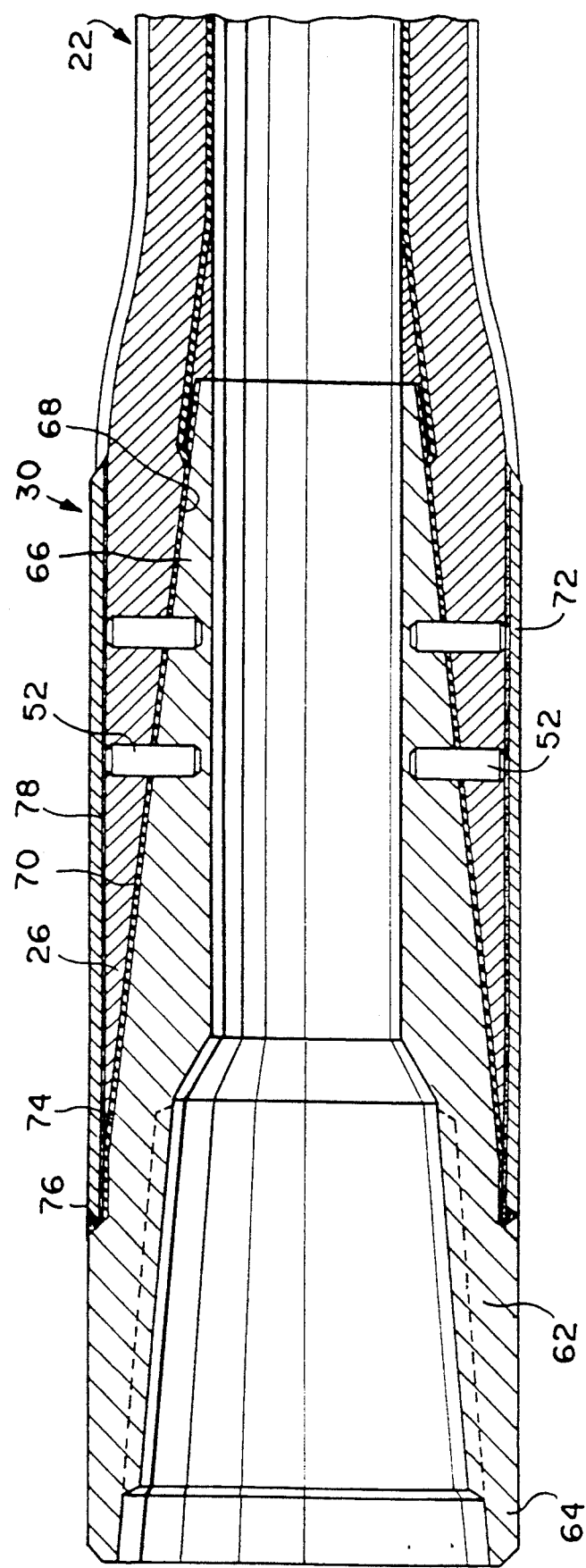
FIG. 4 is a sectional view of the female metal end fitting on the trailing end of the composite drill pipe.

Box connector 30 is shown in FIG. 4 and has a hardened steel end fitting 62 bonded in trailing end 26 of synthetic tube 22. The end fitting has an internally threaded female end 64 and an opposite externally tapered end 66 seated in a complementary taper 68 in the tube trailing end with an adhesive bond 70 formed therebetween. In addition to the adhesive bond, the end fitting is mechanically locked to the trailing end of the tube by a plurality of circumferentially spaced stainless steel dowel pins 52 (four shown in FIG. 4). As discussed above with respect to pin connector 28, radial holes are drilled around the circumference of the tapered trailing end of tube 22 and into end fitting 62. The dowel pins then are press fit into the radial holes to interlock the composite material and the steel end fitting. A steel sleeve 72 is drawn over the resulting joint between end fitting 62 and tube end 26 and is engaged in an annular recess 74 on the end fitting. The sleeve is welded to the steel end fitting, as at 76, and is adhesively bonded to the tube end, as at 78.

The exterior surface of a drill pipe is forced into the sidewalls of an oil well bore when a drilling string is guided in a curved path, thereby inducing unacceptable wear in the drill pipe leading to eventual failure. The amount of contact wear is related directly to the flexibility of the drill pipe. Thus, because unarticulated steel is approximately ten times as stiff as composite material, flexible drill pipe 20 experiences much less wear than would occur in a metal pipe of the same geometry. Nevertheless, radial centralizers 32 are provided to still further limit contact between the drill pipe and the oil well bore.

Figure 5:
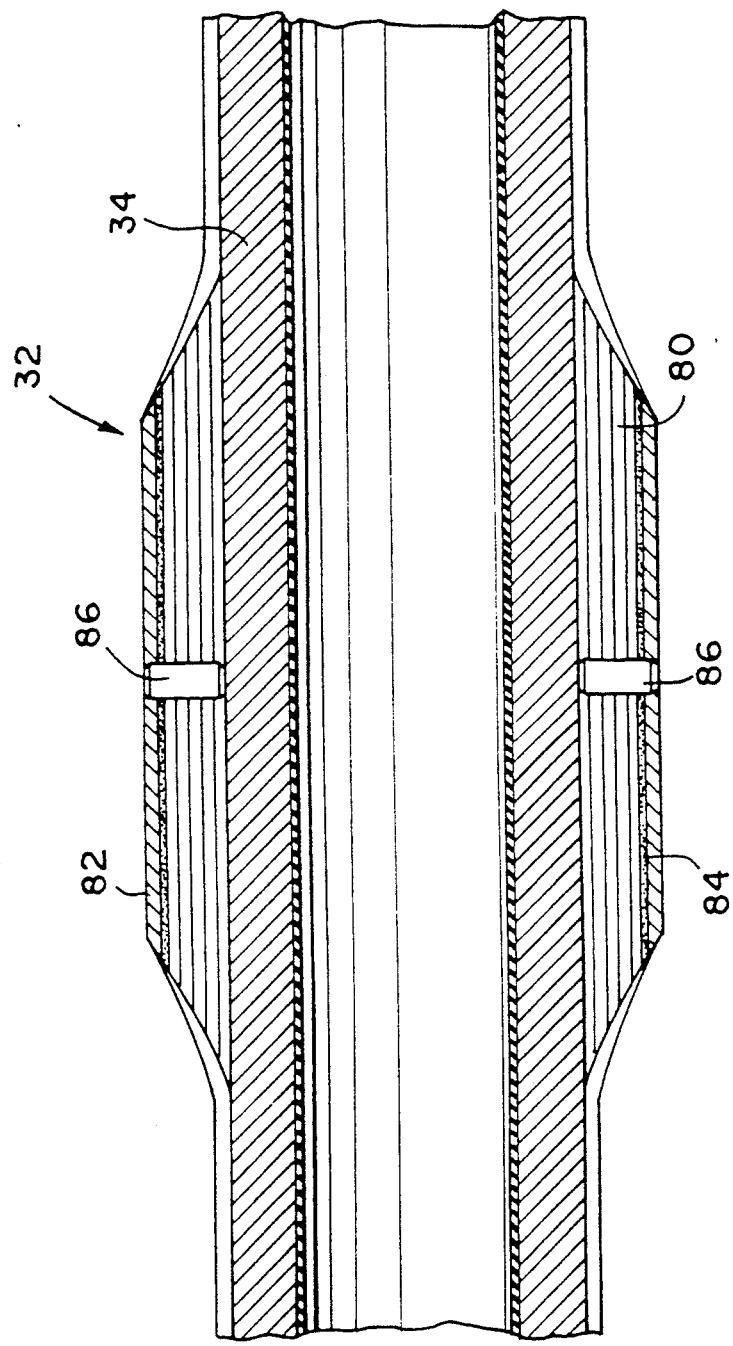
FIG. 5 is a sectional view of one of the radial centralizers on the composite drill pipe.

Referring to FIG. 5, a centralizer 32 is shown in greater detail and has a radial buildup or substructure 80 around the periphery of composite core 34. Preferably, the radial buildup consists of successively wound and bonded layers of glass fibers or other filament which offers acceptable flexural characteristics. A sleeve 82 encases the filament substructure and is adhesively bonded thereto, as at 84. In the exemplary embodiment shown, sleeve 82 is made of stainless steel, however the invention fully comprehends that the sleeve 82 comprise any non-magnetic metal whereby electrical measuring equipment may be housed within the pipe during drilling without subjecting electrical signals associated with the equipment to magnetic characteristics of the drilling string. Circumferentially spaced steel dowel pins 86 (two shown in FIG. 5) extend radially through the steel sleeve and into the substructure. The dowel pins preferably are welded to the sleeve to prevent the pins from working loose during constant rotation and bending of the drill pipe.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A pipe for drilling a well bore, comprising:
    a fiber reinforced synthetic tube, the tube having a leading end and a trailing end spaced axially from the leading end,
    the leading end of the tube being adapted to engage means for drilling a bore through the earth when a force is applied to the trailing end of the tube; and
    centralizer means on the tube to align the tube in the bore and to prevent contact between the tube and sidewalls of the bore when the tube is advanced therethrough, the centralizer means being a buildup of non-metallic material around the periphery of the tube, the buildup being surrounded by a metal sleeve.

2. The pipe of claim 1 in which the fiber reinforced synthetic tube has a length in the range of about 20 feet to about 40 feet.

3. The pipe of claim 1 in which the fiber reinforced synthetic tube has a density in the range of about 0.06 pounds per cubic inch to about 0.08 pounds per cubic inch.

4. The pipe of claim 1 in which the buildup comprises glass fibers.

5. The pipe of claim 4 in which a pin extends radially through the metal sleeve and the buildup.

6. The pipe of claim 1 in which an adhesive bond is provided between the metal sleeve and the buildup.

7. The pipe of claim 1 in which the centralizer means comprises a series of radially extending buildups spaced axially along the tube between the leading end and the trailing end.

8. The pipe of claim 1, including a liner which adhered to an inner wall of the tube.

9. The pipe of claim 8 in which the liner is made of material selected from the group consisting of plastic and elastomeric material.

10. The pipe of claim 1, including a wear resistant outer coating about the tube.

11. The pipe of claim 10 in which the coating comprises ceramic beads in an epoxy compound.

12. The pipe of claim 1 in which the leading end of the tube has a metal fitting and the trailing end of the tube has a metal fitting, the metal fittings at the leading end and the trailing end being complementary mating fittings whereby a plurality of tubes can be serially connected to form a drilling string of desired length.

13. A drilling string for drilling a well bore, comprising:
    a plurality of fiber reinforced synthetic tubes, each tube having a leading end and a trailing end spaced axially from the leading end,
    the leading end of the first one of the tubes being engageable with a bit for drilling a bore through the earth when a force is applied to the trailing end of the last one of the tubes;
    coupling means associated with the adjacent ends of each successive pair of tubes for serially connecting the tubes and defining a drilling string of desired length, the coupling means including a pair of interchangeable fittings respectfully attached to the pair of tubes, the end of one of the pair of tubes having an internal taper and its respective fitting having an external taper; and
    an adhesive bond between the internal taper of the tube and the external taper of the fitting.

14. The drilling string of claim 13 in which one of the fittings has an externally threaded portion and the other of the fitting has an internally threaded portion for receiving the externally threaded portion of the one fitting.

15. A drilling string for drilling a well bore, comprising:
    a plurality of fiber reinforced synthetic tubes, each tube having a leading end and a trailing end spaced axially from the leading end,
    the leading end of the first one of the tubes being engageable with a bit for drilling a bore through the earth when a force is applied to the trailing end of the last one of the tubes;

coupling means associated with the adjacent ends of each successive pair of tubes for serially connecting the tubes and defining a drilling string of desired length, the coupling means including a pair of interchangeable fittings respectfully attached to the pair of tubes, the end of one of the pair of tubes having an internal taper and its respective fitting having an external taper; and a metal sleeve extending around the internally tapered end of the tube and the externally tapered end of the fitting when the fitting is seated in the tube.

16. The drilling string of claim 15 in which an adhesive bond is provided between the metal sleeve and the internally tapered end of the tube.

17. The drilling string of claim 15 in which the metal sleeve is welded to the fitting.

18. A drilling string for drilling a well bore, comprising:

a plurality of fiber reinforced synthetic tubes, each tube having a leading end and a trailing end spaced axially from the leading end, the leading end of the first one of the tubes being engageable with a bit for drilling a bore through the earth when a force is applied to the trailing end of the last one of the tubes;

coupling means associated with the adjacent ends of each successive pair of tubes for serially connecting the tubes and defining a drilling string of desired length, the coupling means including a pair of interchangeable fittings respectfully attached to the pair of tubes, the end of one of the pair of tubes having an internal taper and its respective fitting having an external taper; and a pin extending radially through the internally tapered end of the tube and the externally tapered end of the fitting.

* * * * *